United States Patent [19]

MacLeay et al.

[11] 3,957,750

[45] May 18, 1976

[54] SYMMETRICAL BIS(UNSYMMETRICAL TERTIARY-ALKYL AND TERTIARY-ARALKYL AZO) COMPOUNDS

[75] Inventors: Ronald Edward MacLeay, Williamsville; Chester Stephen Sheppard, Tonawanda, both of N.Y.

[73] Assignee: Pennwalt Corporation, Philadelphia, Pa.

[22] Filed: Dec. 26, 1973

[21] Appl. No.: 428,493

Related U.S. Application Data

[63] Continuation of Ser. No. 88,247, Nov. 9, 1970, abandoned, which is a continuation-in-part of Ser. No. 725,180, April 29, 1968, abandoned, which is a continuation of Ser. No. 616,158, Feb. 15, 1967, abandoned.

[52] U.S. Cl............................ 260/174; 260/885; 260/886; 260/152; 260/156; 260/157; 260/192; 526/218; 526/284; 526/294; 526/295; 526/317; 526/319; 526/321; 526/328; 526/332; 526/335; 526/344; 526/293

[51] Int. Cl.²...................................... C07C 107/02

[58] Field of Search............ 260/174, 152, 157, 156

[56] References Cited
UNITED STATES PATENTS 3,244,692  4/1966  Ham ............................. 260/174 X

*Primary Examiner*—Charles F. Warren
*Attorney, Agent, or Firm*—Charles E. Feeny

[57] ABSTRACT

Novel symmetrical bis(unsymmetrical t-alkyl and t-aralkyl azo) compounds of the general formula I:

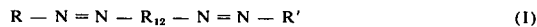

$$R - N = N - R_{12} - N = N - R' \qquad (1)$$

where $R = R' = (R'')_3C-$, e.g., 1,2-ethylene bis(4-t-butylazo-4-cyanovalerate); and the use of I for sequential generation of free radicals, e.g. styrene monomer and 1,2-ethylene bis(4-t-butylazo-4-cyanovalerate) are reacted to obtain polystyrene containing attached azo groups which in turn is reacted with methyl methacrylate monomer to obtain a block copolymer of polystyrene and poly(methyl methacrylate).

6 Claims, No Drawings

SYMMETRICAL BIS(UNSYMMETRICAL TERTIARY-ALKYL AND TERTIARY-ARALKYL AZO) COMPOUNDS

CROSS-REFERENCE TO RELATED APPLICATIONS

This is a continuation of application Ser. No. 88,247, now abandoned, filed Nov. 9, 1970 which in turn is a continuation-in-part of Ser. No. 725,180, now abandoned, filed Apr. 29, 1968, which is a continuation of Ser. No. 616,158, filed Feb. 15, 1967, and now abandoned.

BACKGROUND OF THE INVENTION

This invention relates to new symmetrical bis(unsymmetrical t-alkyl or t-aralkyl azo) compounds (wherein "t" is tertiary) and to synthesis of organic compounds utilizing these novel compounds as sequential free radical initiators, especially to the preparation of polymers containing attached aliphatic azo groups and to block copolymerization using such azo-containing polymers.

Heretofore most syntheses which required sequential free radical initiation utilized two or more different compounds capable of providing free radicals; the compounds being selected to provide free radicals at different conditions as called for by the reaction. Commonly compounds falling into different chemical classes are used.

Bis azo compounds have been known for sometime. Examples of aliphatic bis phenylazos have been prepared. Preparation of trans-1,2-bis-phenylazocyclohexane

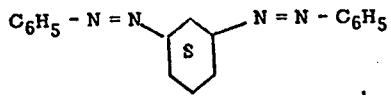

is disclosed by A. J. Bellamy et al., *J. Chem. Soc.*, part C, Org. (1966), 1989-1993. Preparation of t-butyl-bis(-phenylazo)methane

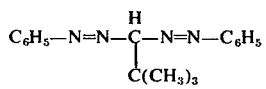

is disclosed by F. Neugebauer et al., Liebigs Ann. Chem. 706, 107-111 (1967). Other bis azo compounds are likewise disclosed in U.S. Pat. No. 2,554,141, in U.S. Pat. No. 3,244,692 and in C. G. Overberger et al., J. Am. Chem. Soc. 80, 6556 (1958) and 77, 4651 (1955). None of these compounds are closely related to applicants novel bis-azo compounds.

SUMMARY OF THE INVENTION

This invention relates to: (A) novel symmetrical bis (unsymmetrical t-alkyl or t-aralkyl azo) compounds of structure I:

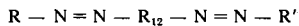

where:
R equals R' equals $(R'')_3C$;
$(R'')_3C$ is a $C_4$ to $C_{20}$ t-alkyl, cycloalkyl, alkylcycloalkyl, arylcylcloalkyl or aralkyl radical where R'' is a $C_1$ to $C_8$ alkyl, $C_7$ to $C_{12}$ aralkyl or $C_6$ to $C_{14}$ aryl radical, not more than one R'' being aromatic in each $(R'')_3C$, and where 2 or 3 of said R''s can join with the tertiary carbon atom to form a cyclo, bicyclo or tricyclo radical of 3 to 12 carbons;
$R_{12}$ can be

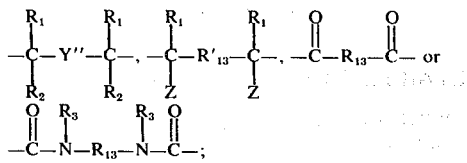

$R_1$ and $R_2$ are separately selected from a $C_1$ to $C_8$ alkyl, $C_3$ to $C_{12}$ cyclo-, bicyclo- or tricycloalkyl, $C_7$ to $C_{12}$ aralkyl or a 5 to 6 membered heterocyclic radical or, taken together, $R_1$ and $R_2$ can form a $C_3$ to $C_{11}$ alkylene diradical; one or more of each of the $R_1$s and $R_2$s can be substituted with lower alkoxy, hydroxy, carboxy, alkoxycarbonyl, acyloxy, halogen, cyano, amido or alkylsulfonato radicals; and $R_1$ can also be a $C_6$ to $C_{14}$ aryl radical;

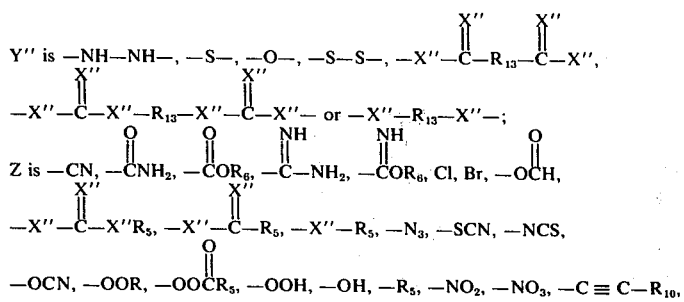

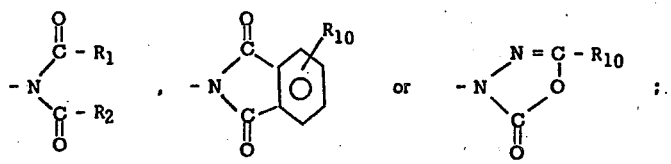

$R'_{13}$ is a $C_2$ to $C_{20}$ symmetrical aliphatic, cycloaliphatic, aromaticaliphatic or aliphatic - cycloaliphatic diradical which optionally contains two or more (normally 2-6) non-adjacent oxygen, sulfur and/or nitrogen atoms in the backbone structure or, when $R_1$ is not phenyl or substituted phenyl, a $C_6$ to $C_{12}$ symmetrical aromatic diradical;

$R_{13}$ is a symmetrical $C_5$ to $C_{15}$ alkyl-cycloalkyl, $C_2$ to $C_{10}$ alkylene, $C_3$ to $C_{12}$ cycloalkylene, $C_6$ to $C_{12}$ aryl or $C_8$ to $C_{15}$ alkyl-aryl diradical;

$R_3$ is hydrogen or a $C_1$ to $C_{10}$ alkyl (e.g. methyl, butyl, octyl) or cycloalkyl

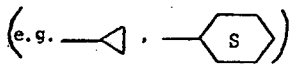

radical;

each $X''$ is separately selected from oxygen and sulfur;

$R_5$ is a $C_1$ to $C_{10}$ alkyl or cycloalkyl or $C_6$ to $C_{12}$ aromatic radical;

$R_6$ is a lower alkyl (preferably $C_1$ to $C_4$) radical; and $R_{10}$ is hydrogen or a $C_1$ to $C_{10}$ alkyl or cycloalkyl or $C_6$ to $C_{12}$ aryl radical, and (B) in the preparation of organic compounds wherein sequential free radical initiation is utilized, to the improvement of using the novel (I) compounds as the source of the sequential free radical generation, especially to the preparation of azo-containing polymers from compounds I and monomers having ethylenic unsaturation; and to block copolymerization of such azo-containing monomers with other vinyl monomers.

DETAILED DESCRIPTION OF INVENTION

The novel compounds of structure I can be prepared in a variety of ways. Several of the methods are described in the working examples. For example an azo compound containing an acylating group such as an anhydride, acid chloride, carboxylic acid or chloroformate may be coupled with an equivalent amount of a difunctional intermediate containing reactive groups such as diamines diols, diphenols and dimercaptans. On the other hand, difunctional compounds as diacid chlorides, dianhydrides, dicarboxylic acids, diisocyanates, dithioacid chlorides, and dichloroformates may be coupled with an equivalent amount of an azo compound containing a reactive functional group such as an alcohol, thiol, phenol or amine. Coupling reactions are well known to the art and involve well known organic reactions such as esterification, amidation, etherification, carbonate formation and many others. Especially suitable compounds for these coupling reactions are the unsymmetrical t-alkyl or t-aralkyl azo compounds containing acylating functions described in our copending application Ser. No. 667,352, filed Sept. 13, 1967.

In some cases it may be beneficial to carry out the coupling reaction on an azo precursor, such as the hydrazo, and then oxidize it to the azo after the coupling reaction.

Another method of preparing structure I compounds is to react a difunctional salt $M_2Y''$ with an $\alpha$-chloro azo compound of general structure II

where:

M is an alkali metal (or alkaline earth metal in which case $MY''$ would be the reactant); and R, $R_1$, $R_2$ and $Y''$ are as defined above.

The sequential decompositions of I can be carried out by a variety of techniques. The preferred method is to use two different temperatures, wherein at the lower temperature, the reaction is carried out for such a time interval that only a partial decomposition of I is obtained, and subsequently, the second stage of the reaction is carried out at the higher temperature to completely decompose the remaining I. Another method is to use the same temperature for both stages, wherein the second stage is initiated after the first stage had been carried out for a specified time interval wherein only partial decomposition of I had occurred. Other methods of decomposing I either partially or completely that can be used inlcude irradiation and chemical activation. Thus a variety of techniques can be used to decompose I in sequence.

Depending upon their structure, the 10-hour half-life temperature of the I compounds can be varied from below 25°C. to about 160°C. Thus, when using thermal decomposition techniques only, the symmetrical bis azo compounds I can be used to generate free radicals in sequence at temperatures from about 20°C. to about 200°C. By employing irradiation or chemical activation techniques, the decomposition temperatures can be lowered to below 0°C.

The amount of I that is used in the practice of the present invention will depend upon whether the I compound is used to generate free radicals in sequence for the purpose of supplying reactant species or initiating species. In the former case, stoichiometric amounts of I are used while in the latter case, relatively smaller amounts are used ranging from 0.005 to 20.0 per cent by weight of the reactants used.

A preferred method of the present invention is to employ the I compounds as sequential free radicals initiators for preparing block copolymers by partially decomposing I in the presence of at least one monomer containing ethylenic unsaturated to prepare an azo-containing polymer, i.e., one in which the polymer contains attached undecomposed azo groups; and subsequently copolymerizing the azo-containing polymer with at least one other vinyl for a time sufficient to complete the decomposition of the undecomposed azo portion of said azo-containing polymer. Standard polymerization techniques are used such as emulsion, suspension, solution and bulk free radical polymerizations.

Any ethylenically unsaturated monomer capable of being polymerized be free radical initiation can be used in the first step of the preferred block copolymer process. Illustrative are the vinyl-type monomers (e.g. styrene) and the conjugated dienes (e.g. butadiene, isoprene, chloroprene and hexadiene).

The experssion "vinyl monomer" includes all those organic compounds containing at least one $CH_2=C<$ group in their molecule. Examples of these monomers are styrene, alpha-methylstyrene, dichlorostyrene, vinyl napthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluroide; vinyl esters of the inorganic acids, such as the halogen acids and hydrocyanic acid, as vinyl chloride, vinyl bromide, acrylonitrile, and methacrylonitrile; the vinyl esters of the monocarboxylylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate; the vinyl ester of the unsaturated acids, such as vinyl acrylate, vinyl crotonate, and vinyl metharcrylate; the vinyl ethers, such as vinyl ethyl ether, vinyl butyl ether, and vinyl allyl ether; the vinyl ketones, such as vinyl butyl ketone, and vinyl ethyl ketone; and the allyl derivatives, such as allyl acetate, allyl butyrate, diallyl phthalate, diallyl adipate, methallyl propionate, allyl chloride, methallyl chloride, allyl acrylate, and methallyl methacrylate. The conjugated dienes, such as butadiene and chloroprene, are suitable.

Block copolymers are useful as compatiblizing agents for normally incompatible polymers.

Many novel compounds of the present invention are taught in the working examples. Some additional typical compounds of the general structure R — N = N — $R_{12}$ — N = N — R' which can be simiarly prepared are illustrated below and many more will be obvious to those skilled in the art:

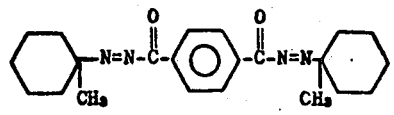

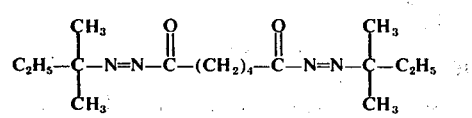

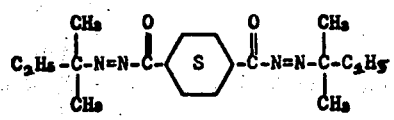

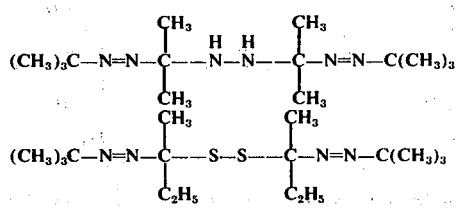

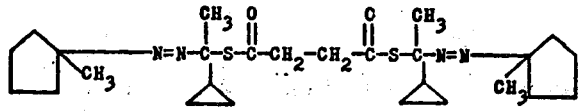

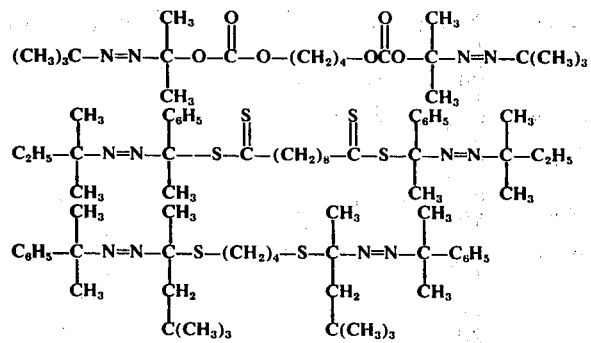

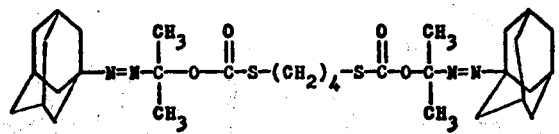

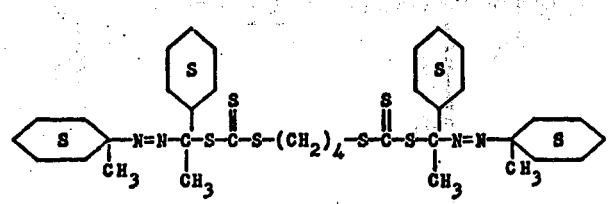

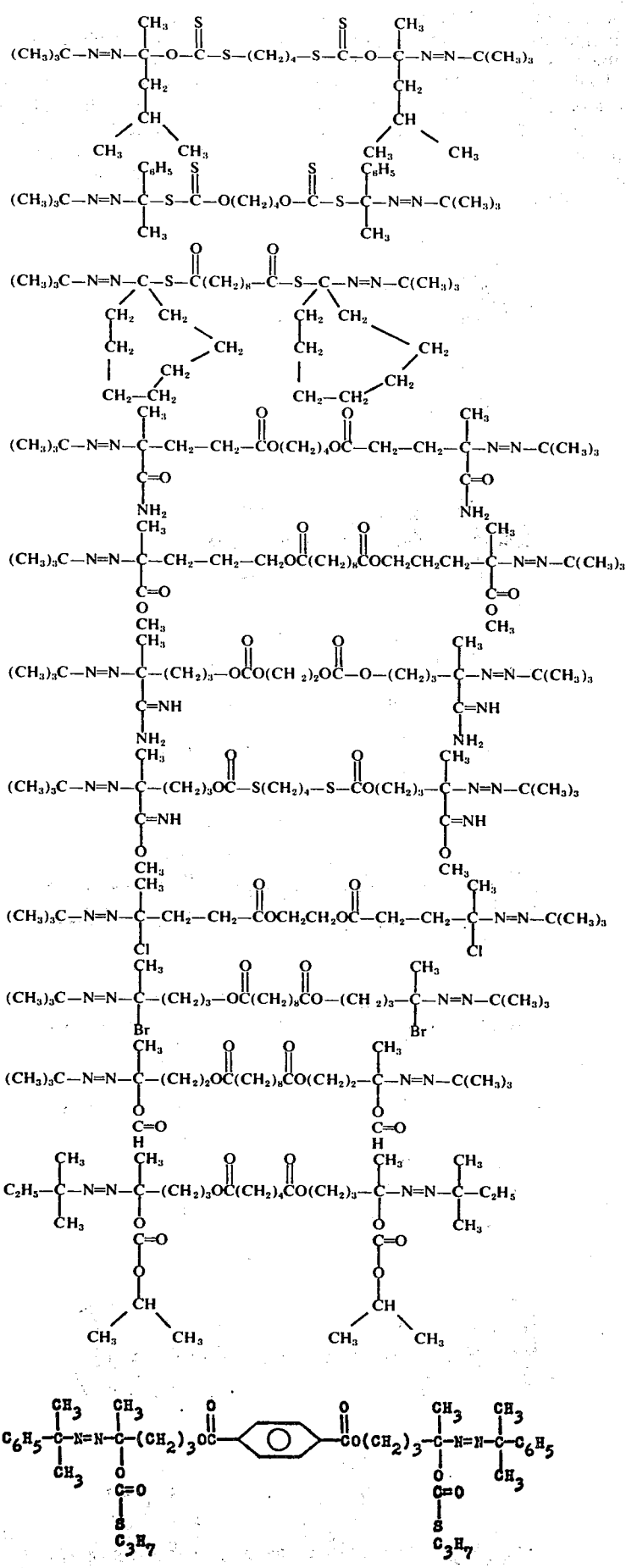

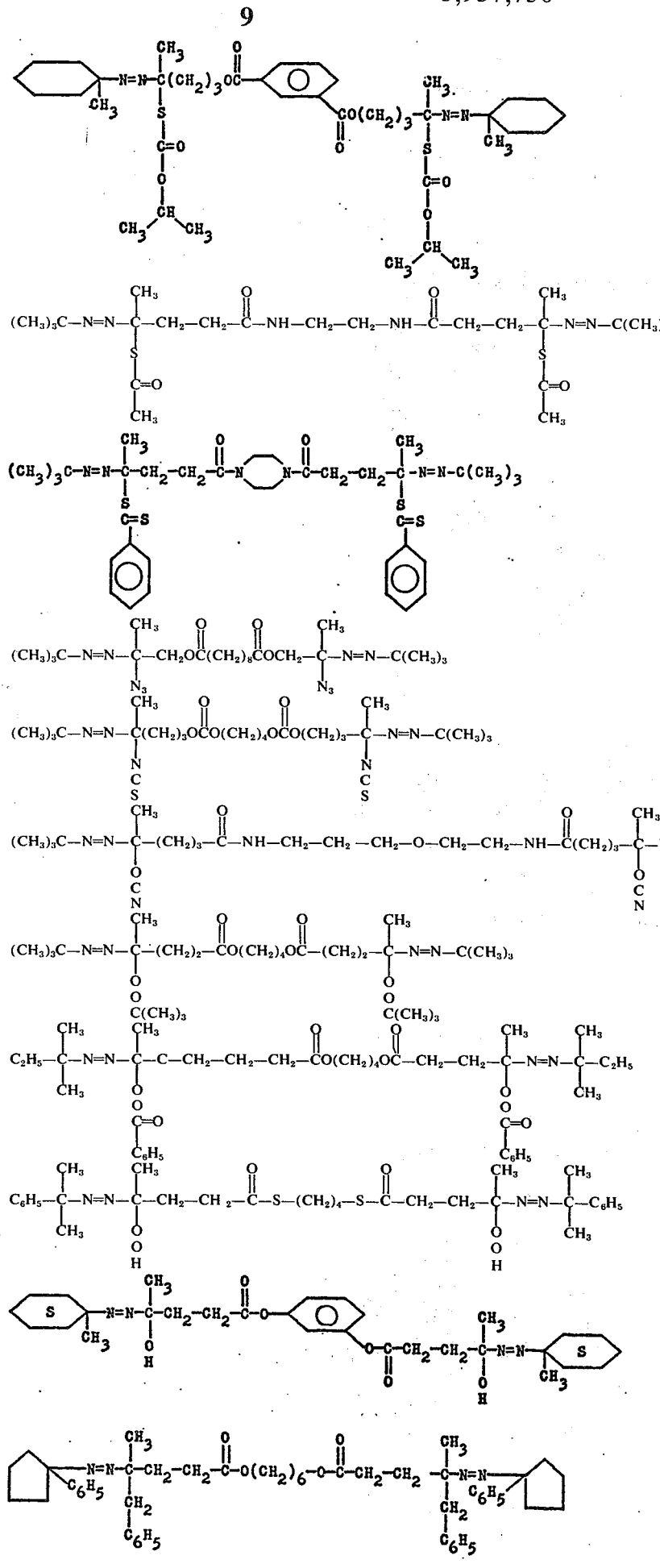

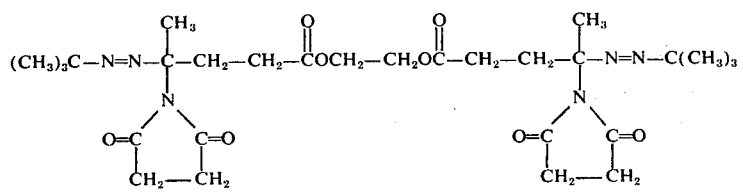
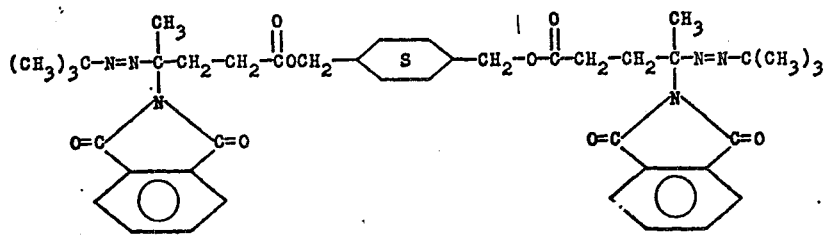
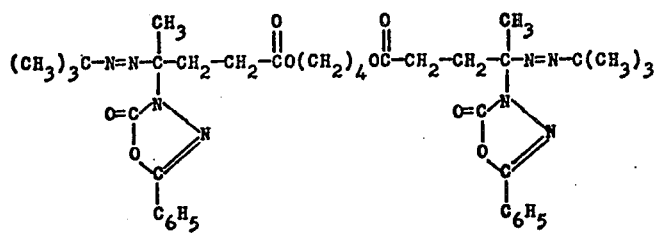
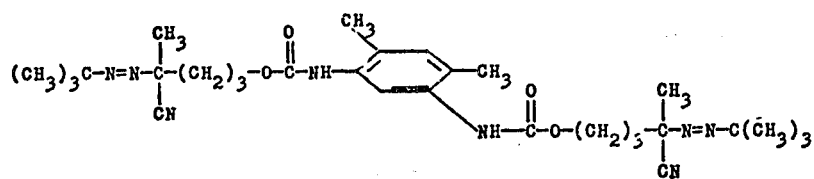
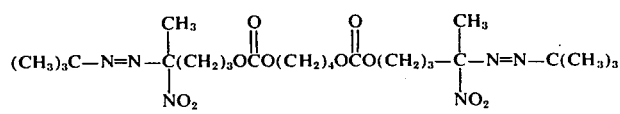
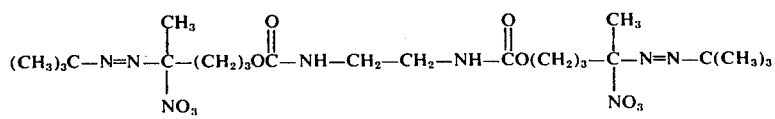
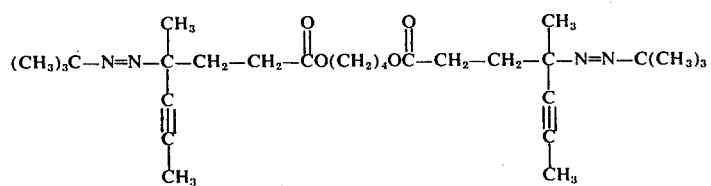
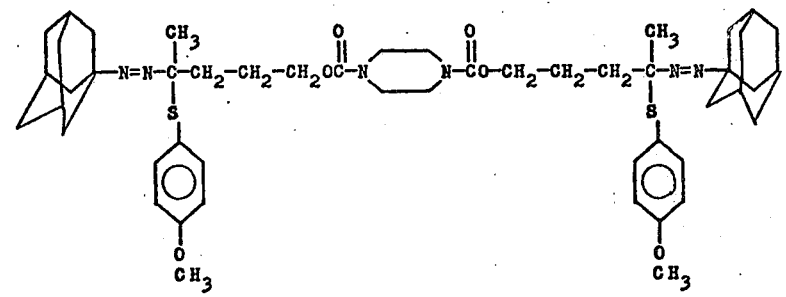

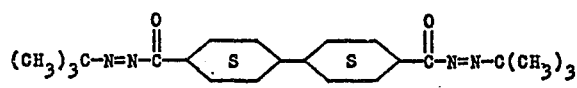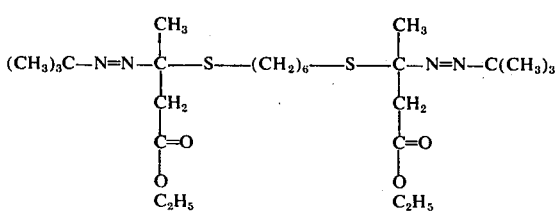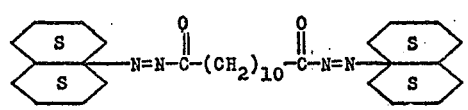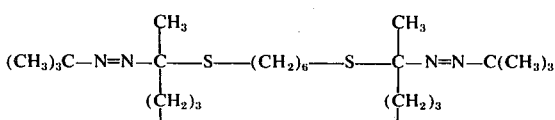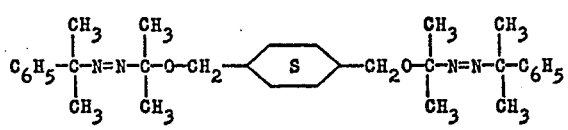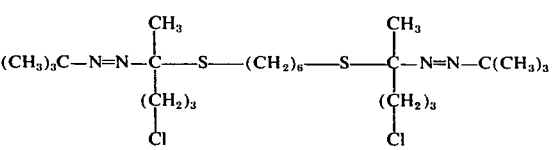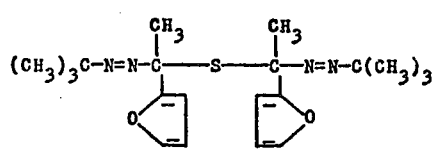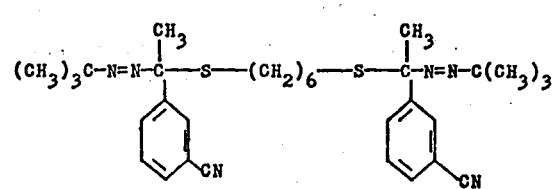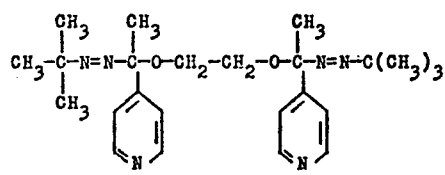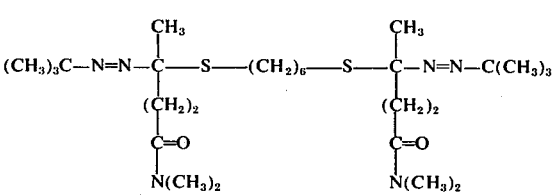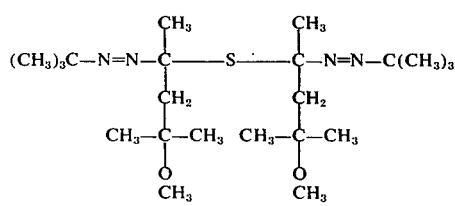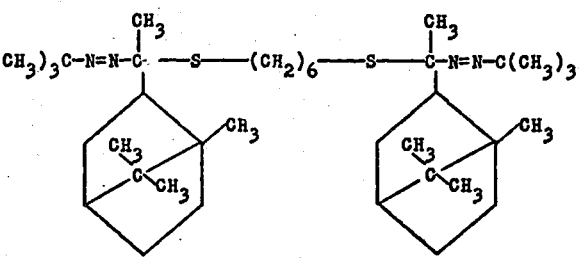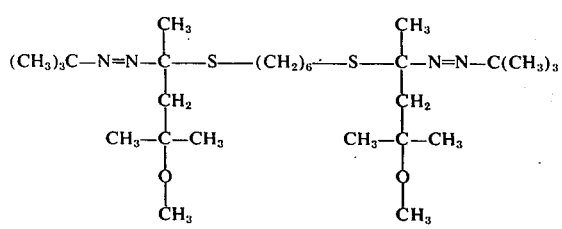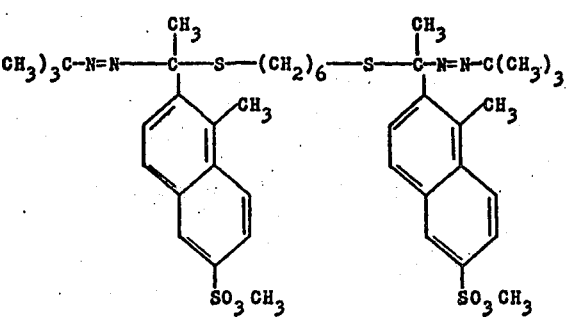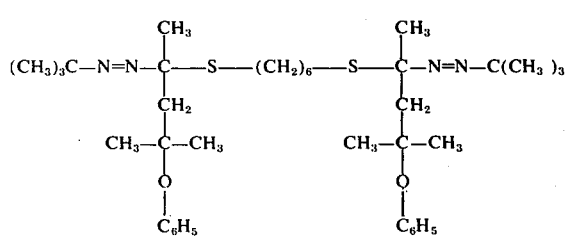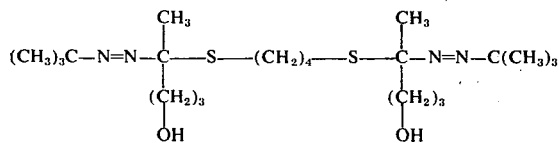

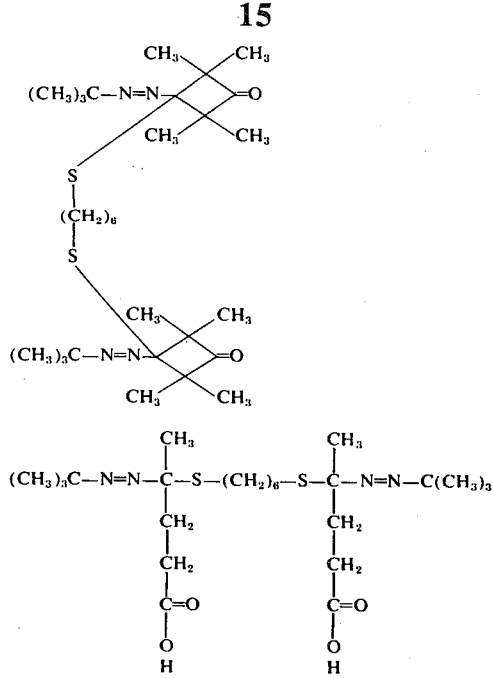

EXAMPLES

Numerous illustrative embodiments of this invention are presented below, but are not to be considered in limitation thereof.

EXAMPLE 1

Preparation of 1,2-Ethylene Bis(4-t-butylazo-4-cyanovalerate)

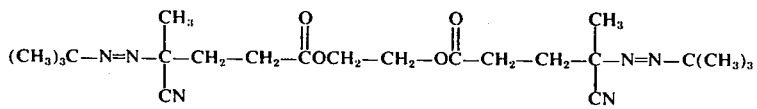

To a stirred solution of 3.1 grams (.05 moles) of ethylene glycol and 10 mls. of pyridine in 100 mls. of methylene chloride in a 250 ml. flask was added 22.9 grams (0.1 moles) of 4-t-butylazo-4-cyanovaleryl chloride over ½ hour holding the temperature at 15°–20°C with a cold water bath. After the addition was complete, the reaction mixture was then washed with water, 5% HCl, water, saturated NaHCO₃ solution, dried over anhydrous Na₂SO₄, filtered, and the methylene chloride evaporated under reduced pressure leaving 21.7 grams (97% yield) of a light yellow liquid. The infrared spectrum was in agreement with the structure of the desired compound with the exception of a small amount of unreacted acid chloride. The product was purified by passing it through an alumina column using pentane as the eluent.

EXAMPLE II

Block Copolymer From 1,2-Ethylene Bis(4-t-butylazo-4-cyanovalerate)

I. Preparation of Azo-containing Polystyrene

There was charged into a pyrex tube 1.0 grams of 1,2-ethylene bis(4-t-butylazo-4-cyanovalerate) of Example I and 20 grams of freshyly distilled styrene monomer. The tube was flushed with nitrogen, sealed and heated to 70°C for 8 hours at which time the reaction was stopped. The polymer was dissolved in benzene and precipitated from methanol. After 3 reprecipitations by a similar technique, the polymer (A) was dried and weighed. The conversion to polystyrene was 90%.

II Preparation of Block Polymer

A solution of 1.0 g. polymer (A) and 2.0 g. methyl methacrylate was added to a 16 × 150 mm. pyrex test tube. The tube was flushed with nitrogen, sealed and heated to 90°C for 1 hour at which time reaction was complete. Copolymer (B) was dissolved in benzene and precipitated from the methanol twice and dried under vacuum.

III. Compatibility Test

To a 16 × 150 mm. test tube was added the following chloroform solutions: 3.0 g. of a 13% polystyrene (Dow PS-3) solution, 3.0 g. of a 13% polymethyl methacrylate (Acryloid A-11, Rohm & Hass) solution and 3.0 g. of a 13% solution of copolymer (B). The tube was sealed and contents mixed thoroughly. A control mixture, containing only 13% chloroform solutions of the two homopolymers was prepared in a similar manner.

The control mixture demixed to form two layers in 0.5 to one hour while the mixture containing copolymer (B) remained stabilized for greater than 11 days.

EXAMPLE III

Preparation of 1,4-Butylene Bis(4-t-butylazo-4-cyanoveralerate)

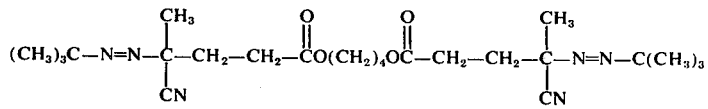

To a stirred solution of 1.9 grams (0.0211 moles) of 1,4-butandediol and 4 mls. of pyridine in 45 mls. of diethyl ether in a 100 ml. flask was added 9.7 grams (0.0422 moles) of 4-t-butyalzo-4-cyanovaleryl chloride over 5 minutes holding the temperature at 25°–30°C with a water bath. After the addition was complete, the reaction was stirred an additional 3 hours at room temperature. The reaction was diluted with water to dissolve the pyridine hydrochloride and the ether layer separated. The ether layer was washed with 5% HCl, water, saturated NaHCO₃ solution, dried over anhydrous Na₂SO₄, filtered and the ether evaporated under reduced pressure to leave 9.15 grams (91% yield) of alight brown liquid. The crude product was purified by passing it through an alumina column using pentane as the eluent. The purified material weighed 5.7 grams and its infrared spectrum was in agreement with that of the desired compound.

EXAMPLE IV

Block Copolymer From 1,4-Butylene Bis(4-t-butylazo-4-cyanovalerate)

I. Preparation of Azo-containing Polystyrene

There was charged into a pyrex tube 1.0 g. of 1,4-butylene bis(4-t-butylazo-4-cyanovalerate) of Example III and 20 grams of freshly distilled styrene monomer. The tube was flushed with nitorgen, sealed and heated to 70°C for 8 hours at which time the reaction was stopped. The polymer was dissolved in benzene and precipitated from methanol. After another reprecipitation by a similar technique, the polymer (C) was dried and weighed. The conversion to polystyrene was 90%.

II. Preparation of Block Polymer

A solution of 1.0 g. polymer (C) and 2.0 g. methyl methacrylate was added to a 16 × 150 mm. pyrex test tube. The tube was flushed with nitrogen, sealed and heated to 90°C for one hour at which time reaction was complete. Copolymer (D) was dissolved in benzene and precipitated from methanol twice and dried over vacuum.

III. Compatiblity Test

To a 16 × 150 mm. test tube was added the following chloroform solutions: 3.0 g. of a 13% polystyrene (Dow PS-3) solution, 3.0 g. of a 13% polymethyl methacrylate (Acryloid A-11, Rohm & Hass) solution and 3.0 g. of a 13% solution of of copolymer (D). The tube was sealed and contents mixed thoroughly. A control mixture, containing only 13% chloroform solutions of the two homopolymers was prepared in a similar manner. The control mixture demixed to form two layers in 0.5 to one hour while the mixture containing copolymer (D) remained stabilized for greater than 14 days.

EXAMPLE V

Preparation of Di(4-t-butylazo-4-cyanopentyl)Sebacate

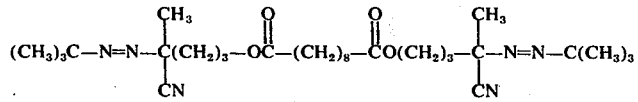

To a solution of 5.60 grams (0.0286 moles) of 4-t-butylazo-4-cyanopentyl alcohol (prepared from t-butylhydrazine, NaCN and 1-acetyl-3-propanol) and 2 mls. of pyridine in 25 mls. of ether in a 100 ml. flask was added 3.42 grams (0.0143 moles) of sebacoyl chloride over 5 minutes, holding the temperature at 25°–30°C with a water bath. After the addition was complete, the reaction was stirred for an additional 2 hours at room temperature. The reaction mixture was then diluted with water, the ether layer separated and washed with 5% HCl, water, saturated NaHCO₃ solution, dried over anhydrous sodium sulfate, filtered and the ether evaporated under reduced pressure. The crude product was a clear yellow liquid weighing 7.25 grams (91% yield). The crude product was purified by passing it through an alumina column using benzene as the eluent. The infrared spectrum of the purified material was in agreement with the structure of the desired compound.

EXAMPLE VI

Block Copolymer From Di(4-t-butylazo-4-cyanopentyl) Sebacate

1. Preparation of Azo-containing Polystyrene

There was charged into a pyrex tube 1.0 g. of di(4-t-butylazo-4-cyanopentyl) sebacate of example V and 20 grams of freshly distilled styrene monomer. The tube was flushed with nitrogen, sealed and heated to 70°C for 8 hours at which time the reaction was stopped. The polymer was dissolved in benzene and precipitated from methanol. After another reprecipitation by a similar technique, the polymer (E) was dried and weighed. The conversion to polystyrene was 90%.

II. Preparation of Block Polymer

A solution of 1.0 g. of polymer (E) and 2.0 g. methyl methacrylate was added to a 16 × 150 mm. pyrex test tube. The tube was flushed with nitrogen, sealed and heated to 90°C for 1 hour at which time reaction was complete. Copolymer (F) was dissolved in benzene and precipitated from methanol twice and dried under vacuum.

III. Compatibility Test

To a 16 × 150 mm. test tube was added the following choloform solutions: 3.0 g. of 13% polystyrene (Dow PS-3) solution, 3.0 g. of a 13% polymethyl methacrylate (Acryloid A-11, Rohm and Hass) solution and 3.0 g. of a 13% solution of copolymer (F). The tube was sealed and contents mixed thoroughly. A control mixture containing only 13% chloroform solutions of the two homopolymers was prepared in a similar manner. The control mixture admixed to form two layers in 0.5 to one hour while the mixture containing copolymer (F) remained stabilized for greater than 14 days.

EXAMPLE VII

Preparation of Ethylene Bis(4-t-butylazo-4-methoxypentyl carbonate)

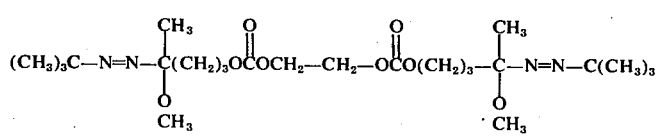

to a solution of 1.6 grams (0.006 moles) of 4-t-butylazo-4-methoxypentyl chloroformate* in 20 ml. of pentane in a 100 ml. round bottom flask was added a solution of 0.19 grams (.003 moles) of ethylene glycol and 0.5 grams (.006 moles) of pyridine in 10 mls. of methylene chloride dropwise over 1 hour. The reaction was stirred an additional ½ hour and then 10 ml. of cold water added. The organic layer was separated, washed with 5% HCl, water, saturated NaHCO₃ solution, dried over anhydrous Na₂SO₄, filtered and the solvent evaporated to leave 0.9 grams (60%) of a light yellow liquid. The infrared specturm was in agreement with the structure of the desired product.

*The synthesis of the chloformates used in Examples VII to XII are described in our copending application Ser. No. 667,352, filed Sept. 13, 1967.

EXAMPLE VIII

Preparation of Ethylene Bis [4-butylazo-4-(p-t-butylthiophenoxy)-pentyl carbonate]

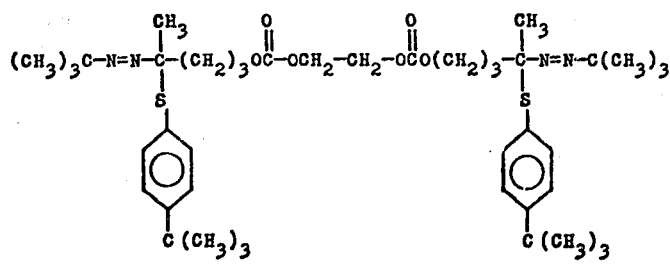

To a solution of 3.6 grams (.009 moles) of 4-t-butylaze-4-(p-t-butylthiophenoxy)pentyl chloroformate in 25 mls. of pentane in a 100 ml. round bottom flask was added a solution of 0.27 grams (0.0045 moles) of ethylene glycol and 0.65 grams (0.009 moles) of pyridine in 10 ml. of methylene chloride dropwise over 1 hour. The reaction was stirred an additional ½ hour and then 10 ml. of cold water added. The organic layer was separated washed with 5% HCl, water, saturated NaHCO₃ solution, dried over anhydrous Na₂SO₄, filtered and the solvent evaporated to leave 2.6 grams (73%) of a yellowish brown viscous liquid. The infrared spectrum was in agreement with the structure of the desired product.

EXAMPLE IX

Preparation of Ethylene Bis(4-t-butylazo-4-thiocyanopentyl carbonate)

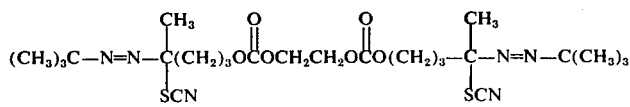

To a solutiton of 1.3 grams (.0045 moles) of 4-t-butylazo-4-thiocyanaopentyl chloroformate in 25 mls. of pentane in a 100 ml. round bottom flask was added of 0.14 grams (0.0022 moles) of ethylene glycol and 0.35 grams (0.0045 moles) of pyridine in 10 mls. of methylene chloride over ½ hour and then 10 ml. of cold water added. The organic was separated, washed with 5% HCl, water, saturated NaHCO₃ solution, dried over anhydrous Na₂SO₄, filtered and the solvent evaporated to leave 1.2 grams (96% yield) of a light yellow liquid. The crude product was purified by passing it through an alumina column using pentane as eluent. The infrared spectrum of the purified material was in agreement with the structure of the desired product.

EXAMPLE X

Preparation of Ethylene Bis(4-t-butylazo-4-phenoxypentyl carbonate)

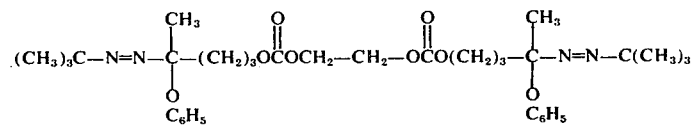

to a solution of 4.8 grams (.0145 moles) of 4-t-butylazo-4-phenoxypentyl chloroformate in 25 ml. of pentane in a 100 ml. round bottom flask was added a solution of 0.45 grams (0.0072 moles) of ethylene glycol and 1.2 grams (0.0145 moles) of pyridine in 10 mls. of methylene chloride over ½ hour at 25°C. The reaction was stirred an additional ½ hour and then 10 ml. of cold water added. The organic layers was separated, washed with 5% HCl, water, saturated NaHCO₃ solution, dried over anhydrous Na₂SO₄, filtered and the solvent evaporated to leave 4.0 grams (87% yield) of a light yellow liquid. The crude product was purified by passng it through an alumina column using pentane as Eluent. The infrared spectrum of the purified material was in agreement with the structure of the desired product.

EXAMPLE XI

Preparation of Ethylene Bis [4-t-butylazo-4-(octylthio)-pentyl carbonate]

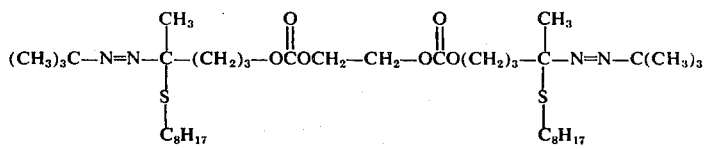

To a solution of 7.5 grams (.02 moles) of 4-t- butylazo-4-(octylthio)pentyl chloroformate in 30 ml. of pentane in a 100 ml. round bottom flask was added a solution of 0.62 grams (0.01 moles) of ethylene glycol and 1.6 grams (0.02 moles) of pyridine in 10 mls. of methylene chloride over ½ hour at 25°C. The reaction was stirred an additional ½ hour and then 10 ml. cold water added. The organic layer was separated, washed with 5% HCl, water, saturated NaHCO₃ solution, dried over anhydrous Na₂SO₄, filtered and the solvent evaporated to leave 6.5 grams (87% yield) of a light brown liquid. The crude product was purified by passing it through an alumina column using pentane as the eluent. The infrared spectrum of the purified material was in agreement with the structure of the desired product.

EXAMPLE XII

Preparation of Ethylene Bis(4-t-butylazo-4-azidopentyl carbonate)

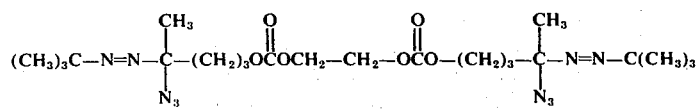

To a solution of 4.2 grams (.015 moles) of 4-t-butylazo-4-azidopentyl chloroformate in 30 ml. of pentane in a 100 ml. round bottom flask was added a solution of 0.475 grams (0.0075 moles) of ethylene glycol and 1.2 grams (0.015 moles) of pyridine in 10 mls. of methylene chloride over ½ hour at 25°C. The reaction was stirred an additional ½ hour and then 10 ml. cold water added. The organic layer was separated, washed with 5% HCl, water, saturated NaHCO₃ solution, dried over anhydrous Na₂SO₄, filtered and the solvent evaporated to leave 3.4 grams (84-yield) of a yellow liquid. The crude product containing a small amount of unreacted chloroformate was purified by passing it through an alumina column using pentane as the eluent. The infrared spectrum of the purified material was in agreement with the structure of the desired product.

EXAMPLE XIII

Preeparation of 1,3-Di(t-butylazocarbonyl)benzene

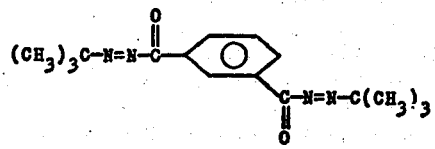

A. Preparation of the di-t-butylhydrazide of isophthalic acid

To a solution 52.7 grams (0.06 moles) of t-butylhydrazine in 400 grams of saturated salt solution in a 1 liter 4-neck round bottom flask equipped with a mechanical stirrer, thermometer, condenser, and dropping funnel was added 50 grams (0.625 moles) of 50% NaOH. The temperature was adjusted to 10°C with an ice bath and a solution of 20.3 grams (0.1 moles) of isophthaloyl chloride in 75 mls. of methylene chloride was added dropwise through the dropping funnel over ½ hour holding the temperature at 10°C +2°. At the end of the addtion, the ice bath was removed and the reaction was stirred an additional 2½ hours. A white solid of formed during the stirring period. The mixture was filtered and the filter cake was washed twice with water and twice with methylene chloride and dired overnight. The dried material weighed 23.5 grams (77% yield) and decomposed with melting at 245°C.

B. Oxidation of the di-t-butylhydrazide of isophthalic acid

To a slurry of 1.5 grams (0.005 moles) of the di-t-butylhydrazide of isophthalic acid in 25 ml. of pentane was added 4.87 grams (0.01 moles) of lead tetraacetate (containing 10% acetic acid) and the mixture stirred 4 hours at 35°C. At the end of the reaction period the mixture was filtered and the pentane layer in the filtrate separated. The red pentane solution as washed with saturated NaHCO₃ solution, water, dried over anhydrous Na₂SO₄, filtered and the pentane evaporated leaving 0.35 grams (23% yield) of an orange-red liquid. The crude product was purified by low temperature recrystallization to give an orange solid with a melting range of 40°-45°C and gassed at 90°C. The infrared spectrum of the purified solid was in arrangement with the structure of the desired compound.

EXAMPLE XIV

Preparation of Ethylene Bis(4-t-amylazo-4-cyanovalerate)

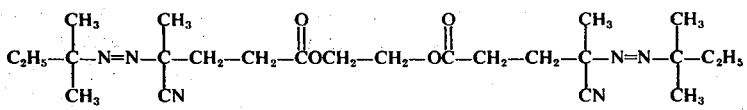

A. Preparation of butyl 4-t-amylazo-4-chlorovalerate

Butyl levulinate t-amylhydrazone was prepared in 90% yield by refluxing an aqueous solution of t-amylhydrazine with an equimolar amount of butyl levulinate.

To a solution of 90 grams (0.316 moles) of butyl levulinate t-amylhydrazone in 150 mls. of petane in a 500 ml. round bottom flask was passed 10.9 grams (.154 moles) of chlorine holding the temperature at −20°C with a dry ice- isopropanol bath. The chlorine was added over 30 minutes and then the reaction was stirred an additional 15 minutes at −20°C and filtered. The filtrate was dried and the pentane evaporated leaving 46.6 grams of crude butyl 4-t-amylazo-4-chlorovalerate.

B. Preparation of butyl 4-amylazo-4-cyanovalerate

To a solution of 6.2 grams (0.126 moles) of sodium cyanide in 100 mls. of 75% aqueus methanol in a 300 ml. flask was added 36.6 grams (0.125 moles) of butyl 4-t-amylazo-4-chlorovalerate dropwise over 50 minutes holding the temperature at 10°C +2° with a cold water bath. After the addition was complete, the cold water bath was removed and the reaction stirred for one hour. The reaction mixture was diluted with 300 mls. of water and the product extracted with pentane. The pentane solution was washed with saturated NaHCO₃ solution, dried over anhydrous sodium sulfate, filtered, and the pentane evaporated to leave 29.7 grams (83% yield) of crude butyl 4-t-amylazo-4-cyanovalerate.

C. Preparation of 4-t-amylazo-4-cyanovaleric acid

To a solution of 27.7 grams (0.0938 moles) of butyl 4-t-amylazo-4-cyanovlaerate in 50 mls. of methanol in a 200 ml. flask was added 6.4 grams (.094 moles) of 85% KOH pellets and the solution stirred for 2 hours at 25°C and for ½ hour at 35°C. The solution was then poured into 200 mls. of cold water and extracted with pentane and the pentane extract discarded. The aqueous layer was acidified to a pH of 3 with conc. HCl and then extracted with methylene chloride. The methylene chloride layer was dried over anhydrous Na₂SO₄, filtered and the methylene chloride evaporated leaving 10.5 grams (50% yield) of a yellow liquid. The liquid was further purified by dissolving it in 10% NaOH and then precipitating it out with conc. HCl. This result in a creamy solid which was filtered off and dried to give 10.0 grams (M.P. 60°–62°C) of 4-t-amylazo-4 -cyanovaleric acid.

D. Preparation of 4-t-amylazo-4-cyanolvaleryl chloride

To a stirred slurry of 10 grams (0.0443 moles) of 4-t-amylazo-4-cyanovaleric acid in 50 mls. of pentane ina 100 ml. flask was added 9.37 grams (0.045 moles) of PCl₅ over a 10 minute period. After the addition was complete, the reaction was stirred at room temperature for another 50 minutes and poured into 100 mls. of ice water. The pentane layer was separated, washed with 10% NaHCO₃ solution, dried over anhydrous Na₂SO₄, filtered and the pentane evaporated to leave 9.0 grams (845 yield) of 4-t-amylazo-4-cyanovaleryl chloride.

E. Preparation of Ethylene Bis(4-t-amylazo-4-cyanovalerate)

To a stirred solution of 0.508 grams (0.0082 moles) of ethylene glycol and 2 mls. of pyridine in 25 ml. pentane was added 4.0 grams (.0164 moles) of 4-t-amylazo-4-cyanovaleryl chloride dropwise holding the temperature at 25°C +2° with a water bath. After the addition was complete, the reaction was stirred for one hour at 24°C, diluted with 25 mls. water and the pentane layer separated. The pentane solution was washed with water, 5% HCl, water, and saturated NaHCO₃ solution, dried over anhydrous Na₂SO₄, filtered and the pentane evaporated to leave 3.2 grams (82% yield) of a clear yellow liquid. The infrared spectrum of the product was in agreement with the structure of the desired product.

EXAMPLE XV

Preparation of Ethylene Bis(4-t-cumylazo-4-cyanovalerate)

A. Preparation of butyl 4-t-cumylazo-4-chlorovalerate

Butyl levulinae t-cumylhydrazone was prepared in 84% yield by refluxing an aqueous solution of t-cumylhydrazine with an equimolar amount of butyl levulinate.

To a solution of 64 grams (0.2 moles) of butyl levulinate t-cumylhydrazone in 150 mls. of petane in a 500 ml. round bottom flask was passed 7.1 grams (0.1 moles) of chlorine holding the temperature at −20°C with a dry ice-isopropanol bath. The chlorine was added over 30 minutes and then the reaction was stirred an additional 15 minutes at −20°C and filtered. The filtrate was dried over anhydrous Na₂SO₄, filtered and the pentane evaporated, leaving 33.6 grams (94.7% yield) of butyl 4-t-cumylazo-4-chlorovalerate.

B. Preparation of butyl 4-t-cumylazo-4-cyanovalerate

To a solution of 1.77 grams (.036 moles) of sodium cyanide in 30 mls. of 75% aqueous methanol in a 100 ml. flask was added 12.25 grams (.0246 moles) of butyl 4-t-cumylazo-4-chlorovalerate dropwise over 50 minutes holding the temperature at 10°C +2° with a cold water bath. After the addition was complete, the cold water bath was removed and the reaction stirred for one hour. The reaction mixture was diluted with 150 mls. of cold water and extracted with pentane. The pentane solution was washed with saturated NaHCO₃ solution, dried over anhydrous sodium sulfate, filtered and the pentane evaporated to leave 10.7 grams (90% yield) of crude butyl 4-t-cumylazo-4-cyanolvalerate.

C. Preparation of 4-t-cumylazo-4-cyanovaleric acid

To a solution of 10.7 grams (0.031 moles) of butyl 4-t-cumylazo-4-cyanovalerate in 30 mls. of methanol in a 100 ml. flask was added 2.8 grams (0.035 moles) of 50% NaOH and the solution stirred for 3½ hours at room temperature. The solution was then poured into 150 mls. of water and extracted with methylene chloride to remove the butyl alcohol and any unreacted ester. The aqueous layer was acidified to pH 3 with conc. HCl and the acid extracted with methylene chloride. The methylene chloride solution was dried over anhydrous Na₂SO₄, filtered and the methylene chloride evaporated to leave 8.4 grams (94% yield) of 4-t-cumylazo-4-cyanovaleric acid.

D. Preparation of 4-t-cumylazo-4-cyanovaleryl chloride

To a stirred slurry of 8.4 grams (0.029 moles) of 4-t-cumylazo-4-cyanovaleric acid in 25 mls. of pentane in a 50 ml. flask was added 6.25 grams (.030 moles) of PCl₅ over a 5 minute period. After the addition was complete, the reaction was stirred at room temperature for one hour and poured into 100 mls. of ice water. The pentane layer was separated, washed, with 10% NaHCO₃ solution, dried over anhydrous Na₂SO₄, filtered and the pentane evaporated to leave 5.7 grams (64% yield) of 4-t-cumylazo-4-cyanovaleryl chloride.

E. Preparation of Ethylene Bis(4-t-cumylazo-4-cyanovalerate)

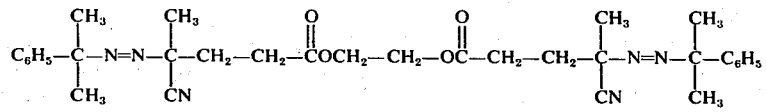

To a stirred solution of 0.22 grams (0.004 moles) of ethylene glycol and 1 ml. of pyridine in 10 mls. of methylene chloride was added 2.2 grams (.0072 moles) of 4-t-cumylazo-4-cyanovaleryl chloride dropwise holding the temperature at 25°C +2°C. After the addition was complete, the reaction was stirred for one hour at room temperature, diluted with 25 mls. of water and the methylene chloride layer separated. The methylene chloride solution was washed with water, 5% HCl, water and saturated NaHCO$_3$ solution, dried over anhydrous Na$_2$SO$_4$, filtered and the methylene chloride evaporated to leave 1.6 grams (74% yield) of a clear yellow liquid. The infrared spectrum of the product was in agreement with the structure of the desired product.

EXAMPLE XVI

Preparation of 2,2-Bis
[4-(1-(t-butylazo)cyclohexoxy)phenyl]propane

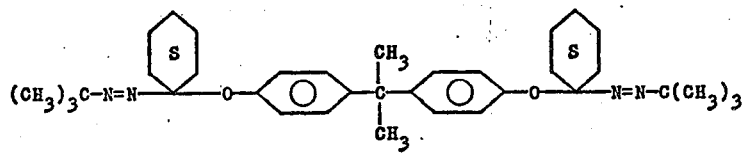

To a solution of 2.28 g. (0.01 moles) of 4,4-isopropylidenediphenol in 25 mls. of dimethylformamide in a 100 ml. beaker was added 1.6 grams (0.02 moles) of 50% NaOH and the mixture stirred 30 minutes at room temperature. To this solution was added 4.1 grams (0.021 moles) of 1-t-butylazo-1-chlorocyclohexane (prepared from cyclohexanone t-butylhydrazone and chlorine) dropwise at room temperature. After the addition was complete, the reaction was stirred 80 minutes at room temperature, poured into 150 ml. of water and extracted with pentane. The pentane solution was washed with water, dried over anhydrous Na$_2$SO$_4$, stirred over alumina, filtered and the pentane evaporated to leave 1.8 grams (32% yield) of a straw colored solid whose melting point was 66°–68°C.

The infrared spectrum of the crude product was in agreement with the structure of the desired compound.

EXAMPLE XVII

Preparation of
Bis(1-t-butylazo-1,3-dimethylbutyl)ether

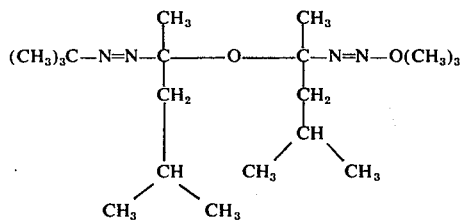

To a slurry of 1.19 grams (0.0283 moles) of sodium hydride in 50 ml. of dioxane in a 100 ml. reaction flask equipped with a magnetic stirrer, thermometer, addition funnel, and gas bubbler was added 5.25 grams (.0283 moles) of 2-t-butylazo12-hydroxy-4-methylpentane (prepared as in WL 1352 from 2-t-butylazo-2-chloro-4-methylpentane and water) and the mixture stirred for 2 hours at 25°C. At this point there was no further hydrogen evolution through the bubbler. To this mixture was added 5.77 grams (.0283 moles) of 2-t-butylazo-2-chloro-4-methylpentane dropwise over 15 minutes keeping the temperature at 20°C. At the end of the addition the reaction was stirred an additional 2½ hours at 20°C, poured into 200 ml. of ice water and extracted with pentane. The pentane solution was washed with water, dried over anhydrous sodium sulfate, filtered, stirred over alumina for 40 minutes, filtered and the pentane evaporated to leave 3.7 grams (37% yield) of a light yellow liquid. The infrared specturm of the crude product is in agreement with the structure of the desired product. It also shows there is some methyl isobutyl ketone present.

EXAMPLE XVIII

Preparation of 1,4-Bis
[1-(t-butylazo)-1,3-dimethylbutoxy] butane

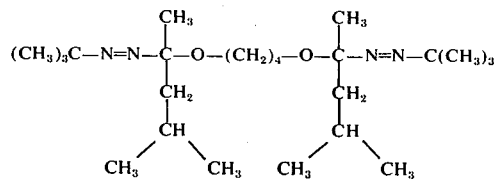

To a slurry of 1.98 grams (.047 moles) of sodium hydride in 50 ml. dioxane in a 100 ml. reaction flask equpped with a magnetic stirrer, thermometer, addition funnel, and gas bubbler, was added 2.11 grams (0.0235 moles) of 1,4-butanediol. The reaction was followed by hydrogen evolution and it required over 8 hours to complete so the reaction was stirred overnight. The next morning, 9.59 grams (0.047 moles) of 2-t-butylazo-2-chloro-4-methylpentane was added dropwise at room temperature to the stirred salt solution. After the addition was complete, the reaction was stirred 4 hours and then checked by gas chromatography. Gas chromatography indicated there was a small amount of unreacted 2-t-butylazo-2-chloro-4-methylpentane left so the reaction was allowed to stir overnight. The next day, the reaction mixture was poured into 200 mls. of cold water and extracted with pentane. The pentane solution was washed with H$_2$O, dried over anhydrous sodium sulfate, filtered and the pentane evaporated to leave 9.3 grams (93% yield) of a straw yellow liquid. The crude product was purified by column chromatography over alumina, using the pentane as the eluent. The infrared spectrum of the purified material was in agreement with the structure of the desired product.

EXAMPLE XIX

Preparation of Di(1-butylazo-1,3-dimethylbutyl)
Succinate

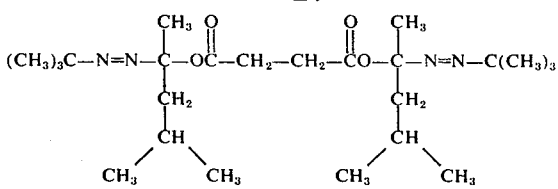

To a slurry of 5.97 grams (0.0221 moles) of sodium succinate in 75 mls. of dimethylformamide in a 200 ml. beaker, warmed to 35°C in a water bath, was added 9.0 grams (.0442 moles) of 2-t-butylazo-2-chloro-4-methylpentane dropwise. After the addition was complete, the reaction was stirred for 3 hours at room temperature, poured into 200 ml. of cold water and extracted with pentane. The pentane solution was washed with water, dried over anhydrous Na$_2$SO$_4$, filtered, stirred over alumina, filtered and the pentane evaporated to leave 6.0 grams (60% yield) of a light yellow liquid. The crude product was purified by column chromatography using pentane as eluent. The infrared spectrum of the purified product was in agreement with the structure of the desired product.

EXAMPLE XX

Preparation of Bis(1-t-butylazo-1,3-dimethylbutyl) Sulfide

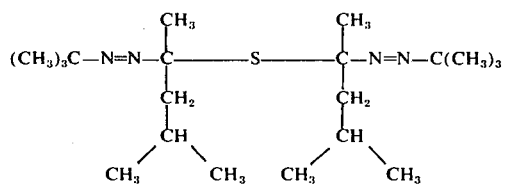

To a solution of 2.14 grams (0.0271 moles) of sodium sulfide in 50 mls. of 75% aqueous methanol in a 200 ml. beaker, cooled to 15°C in a water bath, was added 11.05 grams (0.0543 moles) of 2-t-butylazo-2-chloro-4-methylpentane dropwise over a 15 minute period. After the addition was complete the reaction was stirred for 90 minutes at 15°C, poured into 200 mls. of water and extracted with pentane. The pentane solution was washed with water, dried over anhydrous sodium sulfate, filtered and the pentane evaporated to leave 7.7 grams (77% yield) of a yellow liquid. The infrared spectrum was in argeement with the structure of the desired product. The crude product was purified by low temperature recrystallization from pentane.

EXAMPLE XXI

Preparation of N,N′-Ethylene Bis(t-butylazoformamide)

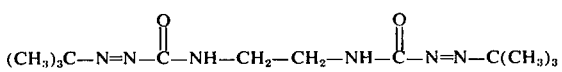

To a solution of 8 g. (0.046 m) of isopropyl t-butylazo-carboxylate in 25 ml. ethanol, cooled to 5°C, was added 1.38 g. (0.023 m) of ethylenediamine dropwise over 5 minutes. The temperature slowly rose to 12° and then subsided. The reaction was stirred an additional ½ hour and the ethanol stripped off. The resulting solid was slurried in warm benzene and filtered. The filter cake weighed 1.7 g. and has a melting point of 166°–167°C. The infrared spectrum of the yellow solid was in agreement with that of the title product.

Evapoartion of the benzene from the filtrate left 2.3 g. of a yellow liquid whose infrared spectrum was in agreement with the structure of the mono product t-butylazo-n-(2-aminoethyl)formamide.

EXAMPLE XXII

Preparation of Di(1-t-butylazo-1-cyclohexyl Sulfide

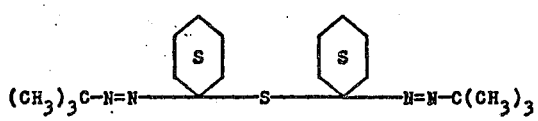

A solution of 1.56 grams (.02 moles) of sodium sulfide in 50 ml. of 75% aqueous methanol was prepared in a 200 ml. beaker and cooled to 15°C. To this solution was added 8.2 grams (.0404 moles) of 1-t-butylazo-1-chlorocyclohexane dropwise over a 15 minute period. After the addition was complete, the reaction was stirred for 45 minutes at room temperature and poured into 100 ml. of cold water. A solid formed and was filtered off and dried. The dried material weighed 2.2 grams (30% yield). The infrared spectrum of the product was in agreement with the structure of the desired compound.

EXAMPLE XXIII

Preparation of Di(1-t-butylazo-1-methylethyl) Sulfide

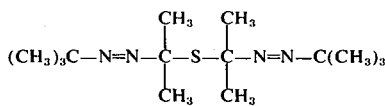

To a solution of 2.73 grams (.035 moles) of sodium sulfide in 30 ml. of water in a 200 ml. beaker was added 11.55 grams (0.071 moles) of 2-t-butylazo-2-chloropropane dropwise with rapid stirring over 15 minutes. After the addition was complete, the reaction was stirred for 1 hour at room temperature, poured into 100 ml. of water and extracted with pentane. The pentane solution was washed with 10% HCl, water, and saturated NaHCO$_3$ solution, dried over anhydrous sodium sulfate, stirred over alumina, filtered and the pentane evaporated under reduced pressure to leave 3.0 grams (30% yield) of a straw yellow liquid. The infrared spectrum of the product was in agreement with that of the desired product.

EXAMPLE XXIV

Preparation of 1,6-Di[1-(t-butylazo)-1,3-dimethylbutylthio]hexane

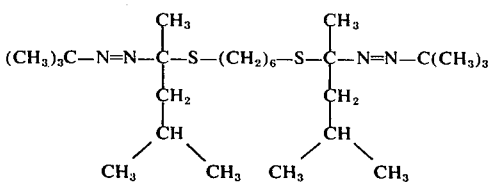

To a solution of 2.7 grams (0.0412 moles) of 85% potassium hydroxide in 50 ml. of methanol in a 250 ml. beaker was added 3.1 grams (0.0206 moles) of 1,6-hexanedithiol dropwise. After the addition was complete, the reaction was stirred for 30 minutes at room temperature and then cooled to 15°C. To the cooled solution was added 8.4 grams (0.0412 moles) of 2-t- butylazo-2-chloro-4-methylpentane dropwise over a 20 minute period keeping the temperature at 15°C. After the addition was complete and the exotherm subsided, the reaction was stirred for an additional 60 minutes at room temperature, poured into 150 ml. water and extracted with pentane. The pentane solution was washed with water, saturated NaHCO₃ solution and water, dried over anhydrous sodium sulfate, filtered and the pentane evaporated to leave 8.5 grams (85% yield) of a light yellow liquid. The infrared spectrum of the product was in agreement with the structure of the desired product.

EXAMPLE XXV

Preparation of 1,4-Cyclohexylenedimethyl Bis [2-(t-butylazo)-isopropyl carbonate]

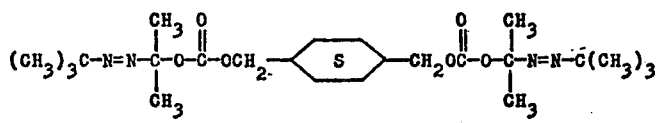

A. Preparation of 2-t-butylazo-2-hydroxypropane 2-t-butylazo-2-hydroxypropane was prepared by reacting aqueous sodium hydroxide and 2-t-butylazo-2-chloropropane in t-butyl alcohol. The 2-butylazo-2-hydroxypropane was isolated by diluting the alcohol solution with water and extracting with pentane.

B. Preparation of sodium 2-t-butylazo-isopropoxide

To a slurry of 1.96 grams (.0467 moles) of 57% sodium hydride (in mineral oil) in 70 ml. of dioxane in a 250 ml. reaction flask equipped with magnetic stirrer, thermometer, addition funnel and gas outlet, was added 6.75 grams (0.0468 moles) of 2-t-butylazo-2-hydroxypropane dropwise over 20 minutes holding the temperature at 10° to 15°C. After the addition was complete, the reaction was stirred for 30 minutes at 20°C. The sodium salt slurry was then ready to be used in step D.

C. Preparation of 1,4-cyclohexylenedimethyl bis chloroformate

To a cold solution (5°C) of 15.8 grams (0.2 moles) of pyridine and 39.2 grams (0.4 moles) of phosgene in 250 ml. of methylene chloride in a 1 liter reaction flask was added 14.62 grams (0.1 mole) of soild 1,4-cyclohexanedimethanol in small portions over 35 minutes, holding the temperature at 0°C with an ice bath. After the addition was complete the reaction was stirred for 20 minutes at 0°C. The ice bath was removed, the reaction slowly warmed to room temperature and stirred for 30 minutes and the excess phosgene stripped off by a water aspirator. A 200 ml. portion of ice water was added and the reaction mixture stirred until the pyridine hydrochloride dissolved. The methylene chloride layer was separated, washed with water, dried over anhydrous sodium sulfate, filtered and stripped. The product weighed 25.3 grams (93.5% yield) and was used as such in step D.

D. Preparation of 1,4-cyclohexylenedimethyl bis [2-(t-butylazo)-isopropyl carbonate]

The slurry of sodium 2-t-butylazo-ispropoxide prepared in step B was cooled to 10°C and solution of 6.32 grams (0.0233 moles) of 1,4-cyclohexylenedimethyl bischloroformate in 10 ml. of methylene chloride added dropwise keeping the temperature at 15°C. After the addition was complete and the exotherm subsided, the reaction was stirred for 60 minutes at room temperature, poured into 200 ml. of cold water and extracted with methylene chloride. The methylene chloride solution was washed with water, dried over anhydrous sodium sulfate, stirred over alumina, filtered and the methylene chloride evaporated under reduced pressure. The residue was a light yellow liquid weighing 10.0 grams (10% yield) which slowly solidified. The infrared spectrum of the product was in agreement with that of the desired compound.

EXAMPLE XXVI

Preparation of S,S-1,6-Hexylene Bis [2-(t-butylazo)isopropyl thiocarbonate]

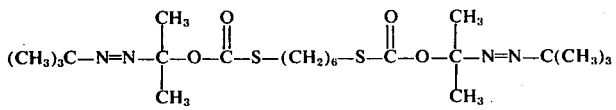

A. Preparation of 1,6-Hexylene Bis(thiochloroformate)

To a cold solution (5°C) of 15.8 grams (0.2 moles) of pyridine and 39.2 grams (0.4 moles) of phosgene in 250 ml. of methylene chloride in a 1 liter reaction flask, was added 15.03 grams (0.1 mole) of 1,6-hexanedithiol dropwise over 25 minutes holding the temperature at 0° to 5°C with an ice bath. After the addition was complete the reaction was stirred for 15 minutes at 5°C and 30 minutes at room temperature. The excess phosgene was stripped off by a water aspirator and the residue washed with 200 ml. of ice cold water to remove the pyridine hydrochloride. The methylene chloride layer was separated, washed again with water, dried over anhydrous sodium sulfate, filtered and the methylene chloride evaporated under reduced pressure to leave 27.4 grams (100% yield) of a colorless liquid.

B. Preparation of S,S-1,6-Hexylene Bis [2-(t-butylazo)isopropyl thiocarbonate]

A slurry of sodium 2-t-butylazo-isopropoxide was prepared as in Example XXV from 5.3 grams (.0368 moles) of 2-t-butylazo-2Hydroxypropane and 1.55 grams (.0368 moles) of sodium hydride in 50 ml. of dioxane. The slurry was cooled to 15°C and 5.02 grams (.0184 moles) of 1,6-hexylene bis(thiochloroformate) added dropwise over a 20 minute period, holding the temperature at 15°C with a cold water bath. After the addition was complete, the reaction was stirred for 60 minutes at room temperature, poured into 150 ml. of cold water and extracted with pentane. The pentane solution was washed with water, saturated NaHCO₃ solution and water, dried over anhydrous sodium sulfate, stirred over alumina, filtered and the pentane evaporated to leave 4.0 grams (44.5% yield) of a ight yellow liquid. The infrared spectrum of the product was in agreement with the structure of the desired compound.

What is claimed is:

1. Symmetrical bis(unsymmetrical t-alkyl or t-aralkyl azo) compounds

where:

R equals R' equals (R'')₃C;

(R'')₃C is $C_4$–$C_{20}$ t-alkyl, cycloalkyl, alkylcycloalkyl, arylcycloalkyl or aralkyl where R'' is $C_1$–$C_8$ alkyl, $C_7$–$C_{12}$ aralkyl $C_6$–$C_{14}$ aryl, not more than one R'' being aromatic, and 2 or 3 of said R''s can join with the tertiary carbon atom to form a cyclo-, bicyclo- or tricyclo-hydrocarbon radical of 3–12 carbons.

$R_{12}$ is

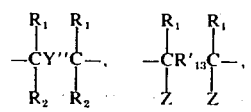

or

$R_1$ and $R_2$ are $C_1$–$C_8$ alkyl, $C_3$–$C_{12}$ cyclo-, bicyclo- or tricycloalkyl, $C_7$–$C_{12}$ aralkyl, or 5-6 membered heterocyclic wherein the hereto atom is O or N, $R_1$ and $R_2$ taken together can form a $C_3$–$C_{11}$ alkylene diradical; one or more of each of the $R_1$s and $R_2$s can be substituted with lower alkoxy, hydroxy, carboxy, lower alkoxycarbonyl, lower alkylcarbonyloxy, halo, cyano, dimethylamido or lower alkylsulfonato radicals, and $R_1$ can also be $C_6$–$C_{14}$ aryl;

Y'' is —NHNH—, —S—, —O—, —SS—, $$-X''\overset{X''}{\underset{\parallel}{C}}R_{13}\overset{X''}{\underset{\parallel}{C}}X''-, \quad -X''\overset{X''}{\underset{\parallel}{C}}X''R_{13}X''\overset{X''}{\underset{\parallel}{C}}X''- \text{ or } -X''R_{13}X''-;$$

Z is —CN, —Cl, —Br, —X''R₅, —N₃, —SCN, —NCS, —OCN —OOR, —OOH, —OH, —R₅, —NO₂, —NO₃, —C CR₁₀, —C(=O)NH₂, —C(=O)OR₆, —C(=NH)NH₂, —C(=NH)OR₆, —OC(=O)H, —X''-C(=X'')X''R₅, —X''C(=X'')R₅, —OOC(=O)R₅,

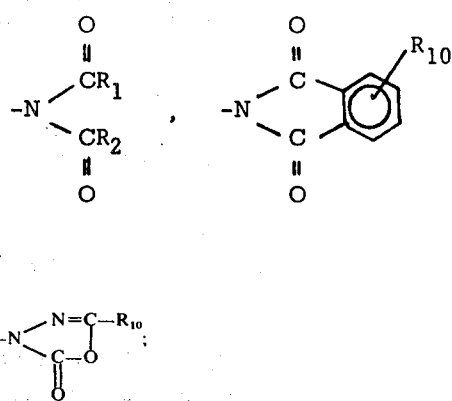

$R'_{13}$ is a $C_2$–$C_{20}$ symmetrical diradical selected from alkyl, alkylaralkyl or alkylcycloalkylalkyl groups optionally containng two or more non-adjacent oxygen, sulfur or nitrogen atoms in the backbone structure, cycloalkyl or, when $R_1$ is not phenyl or substituted phenyl, from $C_6$–$C_{12}$ hydrocarbon aromatic;

$R_{13}$ is a symmetrical $C_5$–$C_{15}$ alkyl-cycloalkyl, $C_2$–$C_{10}$ alkylene, $C_3$–$C_{12}$ cycloalkylene, $C_6$–$C_{12}$ hydrocarbon aryl or $C_8$–$C_{15}$ alkyl-aryl diradical;

X'' is oxygen or sulfur;

$R_5$ is $C_1$–$C_{10}$ alkyl or cycloalkyl or $C_6$–$C_{12}$ hydrocarbon aromatic;

$R_6$ is lower alkyl; and $R_{10}$ is hydrogen, $C_1$–$C_{10}$ alkyl or cycloalkyl or $C_6$–$C_{12}$ hydrocarbon aryl.

2. 1,2-Ethylene bis (4-t-butylazo-4-cyanovalerate).
3. 1,4-Butylene bis(4-t-butylazo-4-cyanovalerate).
4. Di(4-t-butylazo-4-cycanopentyl)sebacate.
5. Bis(1-t-butylazo-1,3-dimethylbutyl)-sulfide.
6. 1,6-Di-[1-(t-butylazo)-1,3-dimethylbutylthio]hexane.

* * * * *